(12) United States Patent
Juel et al.

(10) Patent No.: US 11,904,901 B2
(45) Date of Patent: Feb. 20, 2024

(54) USER-SPECIFIED LOCATION-BASED AUTONOMOUS VEHICLE BEHAVIOR ZONES

(71) Applicant: GM Cruise Holdings LLC, San Francisco, CA (US)

(72) Inventors: Jeremy Stephen Juel, San Francisco, CA (US); Alexander Willem Gerrese, San Francisco, CA (US); Yifei Zhang, San Francisco, CA (US); Aakanksha Mirdha, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 337 days.

(21) Appl. No.: 17/159,187

(22) Filed: Jan. 27, 2021

(65) Prior Publication Data

US 2022/0234627 A1 Jul. 28, 2022

(51) Int. Cl.
| | |
|---|---|
| *B60W 60/00* | (2020.01) |
| *G08G 1/00* | (2006.01) |
| *H04W 4/02* | (2018.01) |
| *H04W 4/44* | (2018.01) |
| *G06Q 30/0204* | (2023.01) |
| *G06Q 10/02* | (2012.01) |
| *G06Q 50/30* | (2012.01) |
| *G05D 1/02* | (2020.01) |
| *B60W 50/10* | (2012.01) |

(52) U.S. Cl.
CPC ..... *B60W 60/00253* (2020.02); *G05D 1/0291* (2013.01); *G06Q 10/02* (2013.01); *G06Q 30/0205* (2013.01); *G06Q 50/30* (2013.01); *G08G 1/20* (2013.01); *H04W 4/023* (2013.01); *H04W 4/44* (2018.02); *B60W 50/10* (2013.01); *B60W 2540/215* (2020.02)

(58) Field of Classification Search
CPC ........... B60W 60/00253; B60W 50/10; B60W 2540/215; G05D 1/0291; G06Q 10/02; G06Q 30/0205; G06Q 50/30; G08G 1/20; G08G 1/202; G08G 1/207; H04W 4/023; H04W 4/44; G01C 21/3641; G01C 21/3697

See application file for complete search history.

(56) References Cited

U.S. PATENT DOCUMENTS

| | | | |
|---|---|---|---|
| 10,035,519 B2 | 7/2018 | Minster et al. | |
| 10,134,286 B1 * | 11/2018 | Elswick | ................. G08G 1/205 |
| 2014/0195074 A1 * | 7/2014 | Hunt | ................... F02D 41/2487 |
| | | | 701/1 |

(Continued)

FOREIGN PATENT DOCUMENTS

JP 2014190973 A * 10/2014

*Primary Examiner* — Isaac G Smith
*Assistant Examiner* — Nikki Marie M Molina
(74) *Attorney, Agent, or Firm* — Akona IP PC (57) ABSTRACT

Systems and methods for creation of custom behavior zones for autonomous vehicles, providing a more tailored experience for passengers as well as businesses. Custom behavior zones allow passengers to request or select a specific pickup/drop-off location on private property. In some examples, custom behavior zones are created in private gated communities, on residential properties with long driveways, on government property, and at businesses that have multiple entrances and/or offer different services at various locations on the business property.

20 Claims, 8 Drawing Sheets

(56) References Cited

U.S. PATENT DOCUMENTS

| | | | |
|---|---|---|---|
| 2018/0011485 A1* | 1/2018 | Ferren | G05D 1/0038 |
| 2019/0004524 A1* | 1/2019 | Wang | B60W 30/09 |
| 2019/0265703 A1* | 8/2019 | Hicok | G05D 1/0088 |
| 2020/0104962 A1* | 4/2020 | Aich | G06Q 50/30 |

* cited by examiner

USER-SPECIFIED LOCATION-BASED AUTONOMOUS VEHICLE BEHAVIOR ZONES

FIELD OF THE DISCLOSURE

The present disclosure relates generally to autonomous vehicles (AVs) and to systems and methods for.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Vehicles are often used to provide rides to destinations with primary drop-off locations on private property. For example, drop-off locations can include hotel lobbies off the main road and houses at the end of long driveways. Additionally, businesses may have main drop-off zones on private property, and some locations may have preferred handicap entrances. Autonomous vehicle mapping vehicles generally do not travel on private property and do not have high fidelity maps of these locations.

SUMMARY

Systems and methods are provided for user-specified location-based autonomous vehicle behavior zones. In particular, public-facing tools are provided for creation of custom behavior zones, providing a more tailored experience for passengers as well as businesses. Custom behavior zones allow passengers to request or select a specific pick-up/drop-off location on private property. In some examples, custom behavior zones are created in private gated communities, on residential properties with long driveways, on government property, and at businesses that have multiple entrances and/or offer different services at various locations on the business property.

According to one aspect, a method for defining a behavior zone for an autonomous vehicle fleet includes receiving a behavior zone request for a selected location, identifying a behavior type to customize, determining specific vehicle behaviors associated with the behavior zone request, reviewing the behavior zone request.

According to another aspect, a system for defining a behavior zone for an autonomous vehicle fleet includes an online portal configured to receive a behavior zone request including a behavior zone location and a behavior type; and a central computing system configured to receive the behavior zone request, review the behavior zone request, and determine specific vehicle behaviors associated with the behavior zone request.

According to another aspect, a method for providing autonomous vehicle rides to private property includes receiving a passenger destination location including a behavior zone, presenting passenger behavior zone options, receiving a passenger selection within the behavior zone, driving into the behavior zone, and following behavior zone directions corresponding to the passenger selection.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Systems and methods are provided for user-specified location-based autonomous vehicle behavior zones. In particular, public-facing tools are provided for creation of custom behavior zones, providing a more tailored experience for passengers as well as businesses. Custom behavior zones allow users to request or select a specific pick-up/drop-off location on private property. In some examples, custom behavior zones are created in private gated communities, on residential properties with long driveways, and at businesses that have multiple entrances and/or offer different services at various locations on the business property.

Many passenger pick-up and drop-off requests may involve driving onto private property to complete the ride. Additionally, some types of businesses offer multiple different types of services at their physical locations. For example, a restaurant can have a main entrance for customers to order and/or eat in the restaurant as well as a drive-through lane for ordering and pick up food to go. Similarly, big box stores often have a main entrance for customers to enter the store for in person shopping and another location allocated to curbside pick-up. In another example, airports have allocated passenger pick-up and passenger drop-off areas, and some airports have multiple pick-up and drop-off areas such as one for each airport terminal. In another example, hotels often have check-in loading zones. Industrial districts often have large open parking areas with various entrances located throughout the property. Additionally, residential properties can be large and have a lengthy driveway from the road to a house entrance. Some residential properties are located in gated or otherwise private communities with a public street entrance that is far from the entry to a particular house. Furthermore, many properties have wheelchair ramps for people with physical impairments. In order for autonomous vehicles to meet the needs of businesses and individuals, autonomous vehicles need to have knowledge of the particular regions and properties and how to behave inside them. End users can then determine whether to opt in or out of special behaviors inside the regions.

Autonomous vehicle maps generally only include public roadways, and the special regions on private properties are not included. Systems and methods are needed for adding maps of these properties to provide a more tailored experience for passengers and the businesses they visit. In particular, public-facing tools allow others to suggest custom behavior zones. Behavior zones can include one or more of drive through lanes, various alternative drop-off and pick-up areas, loading zones, curbside pick-up zones, and wheelchair-accessible drop-off locations. In some examples, autonomous vehicle behaviors in the behavior zones can be specified, where the behaviors include speed limits in selected areas and stops in drive-through lanes.

Example Autonomous Vehicle Configured for User-Specified Behavior Zones

Figure 1:
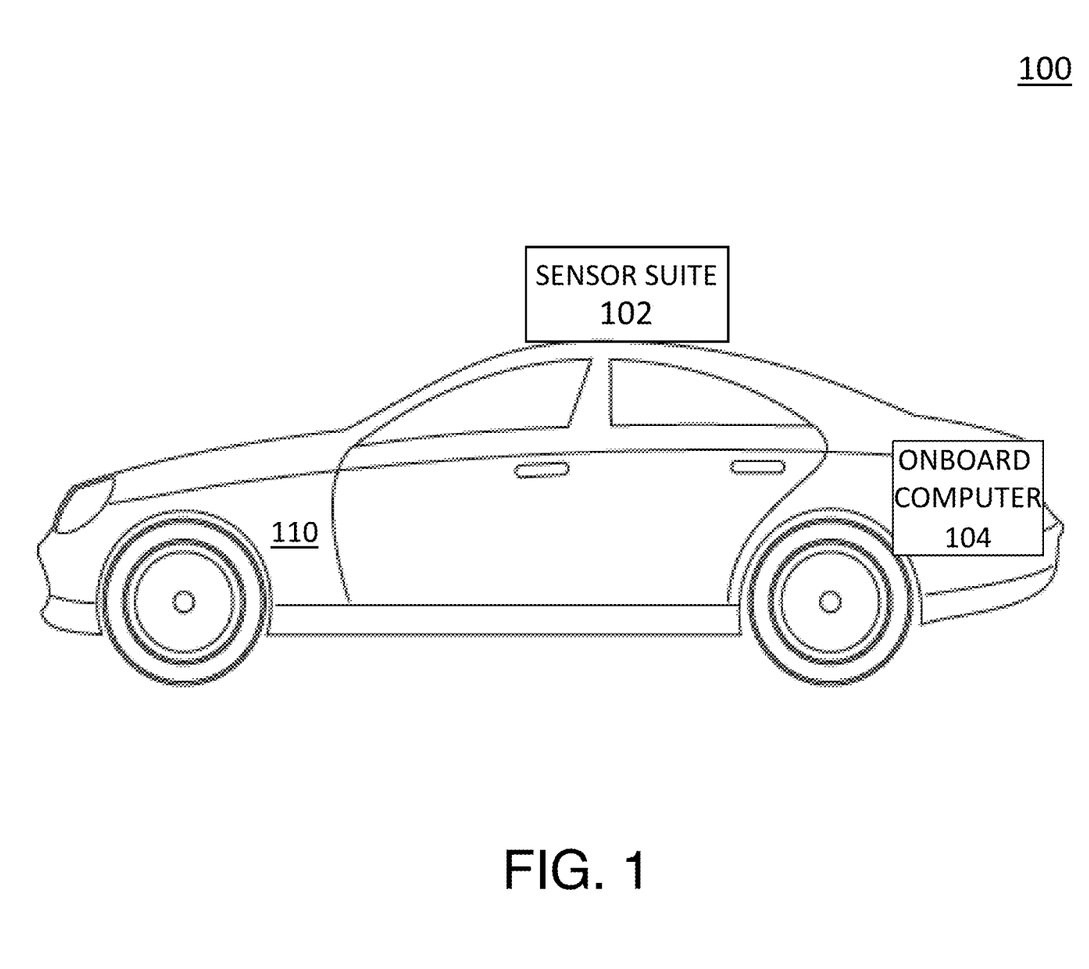
FIG. 1 is a diagram illustrating an autonomous vehicle, according to some embodiments of the disclosure.

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 is configured for receiving user-specified location-based behavior zones.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events. In particular, data from the sensor suite 102 can be used to update a map with information used to develop layers with waypoints identifying selected events, the locations of the encountered events, and the frequency with which the events are encountered at the identified location. When the autonomous vehicle 110 drives onto private property and into a user-specified location-based behavior zone, the sensor suite 102 can record and update a map with information about the zone. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Based upon the vehicle state and programmed instructions, including behavior zone instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via an event host interface, via a vehicle coordinator, or via a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for Defining a Behavior Zone

Figure 2:
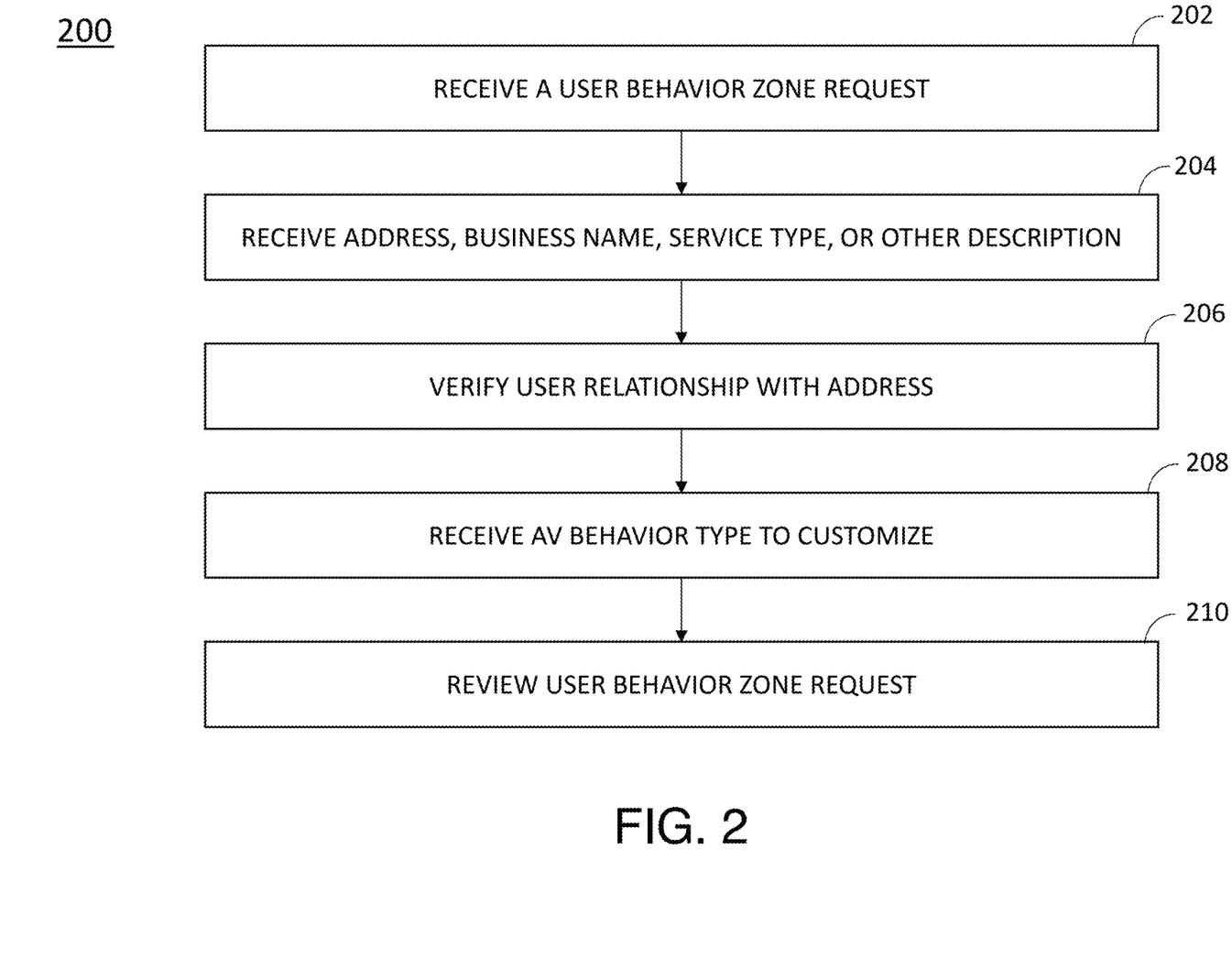
FIG. 2 is a diagram illustrating a method for defining a behavior zone, according to some embodiments of the disclosure.

FIG. 2 is a diagram illustrating a method 200 for defining a behavior zone, according to some embodiments of the disclosure. At step 202, a behavior zone request is received from a user. In some examples, a user opens a mobile or desktop application or portal for submitting a behavior zone request. In some examples, an autonomous vehicle business provides a business portal including a map. At step 204, the address, business name, service type, or other description of the property is received. In some examples, the property location is indicated on a map in the application and/or portal.

At step 206, the user's relationship with the property is verified. In some examples, the user is the property owner. In other examples, the user is a representative of the property owner, and/or an employee of the property owner. For example, a hotel or restaurant manager or other employee may submit the behavior zone request. In some examples, the user is a customer of a business and the customer would like an autonomous vehicle to take them to a specific location on the business property. In some examples, user verification happens after the behavior zone request is entered.

At step 208, the autonomous vehicle behavior type to customize is received. In some examples, a user selects from a pre-defined list of autonomous vehicle behavior types. The pre-defined list includes one or more of: drive-through behavior, alternative pick-up and/or drop-off locations, loading zone location identification, speed limits, and wheelchair-accessible pick-up and/or drop-off location. In some examples, a user uploads photos and/or videos of selected locations. At step 210, the behavior zone request is reviewed. Following review, the behavior zone can be approved, denied, or edited. In some examples, parts of the behavior zone are approved while others are denied or edited.

Once a behavior zone is approved and uploaded to the mapping system for a vehicle fleet, it will be available to users through the rideshare application. In some examples, a limited number of behavior zones are added at a time, to ensure that new definitions do not cause problems and lead to user complaints and/or affect safety standards.

In some examples, users can provide feedback regarding behavior zones, as described in greater detail below with respect to FIGS. 6 and 7. User reports can be used to confirm accuracy of behavior zone locations and definitions, and to ensure high quality standards.

Example Behavior Zone for Drive-Through Behavior

Figure 3:
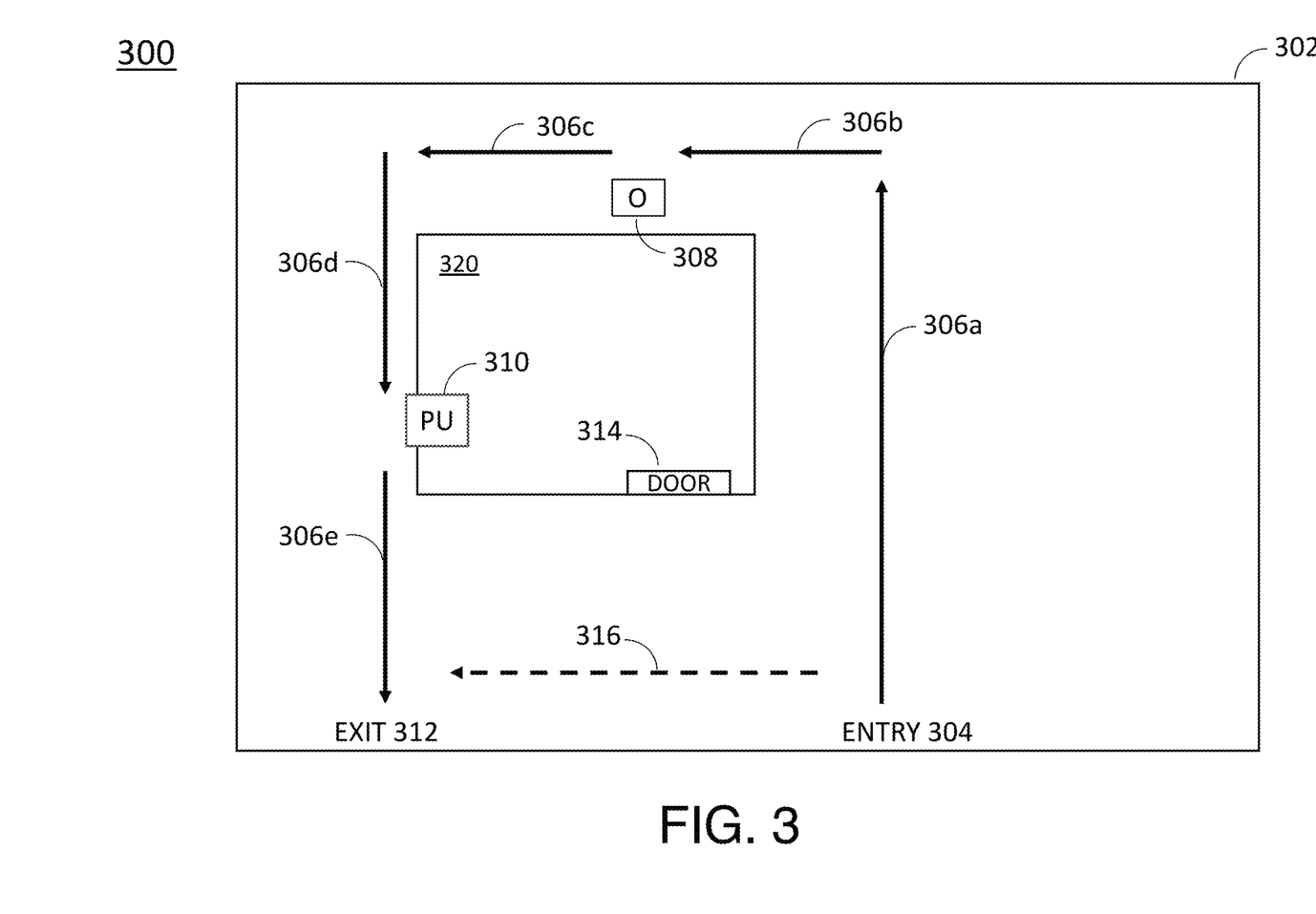
FIG. 3 is a diagram illustrating a map of a property for defining a behavior zone, according to some embodiments of the disclosure.

FIG. 3 shows a map 300 of a property 302 for defining a behavior zone, according to some embodiments of the disclosure. In particular, the map 300 shows a property including a restaurant 320 that has a doorway 314 for customers to enter in person and also a drive-through option. According to some implementations, when a user accesses the map 300 through a portal and/or application and requests to add a drive-through behavior zone for the property 302, the user is asked to identify selected locations and to mark certain routes on the map 300. In particular, the user can be asked to identify the entry to the property, the ordering booth, the pick-up window, and the exit from the property. The user can then be prompted to draw on the map the route from the entry to the ordering booth, the route from the ordering booth to the pick-up window, and the route from the pick-up window to the exit.

In particular, using the map 300, a user identifies the vehicle entry 304 location to the property 302. Next, a user can draw on the map 300 a first part of the drive-through route, from the entry 304 to the ordering booth 308, including sections 306a and 306b. The user identifies the location of the ordering booth 308 by marking it on the map. In some examples, the portal and/or application for adding a drive-through behavior zone includes an option specifically for identifying the ordering booth location.

The user also identifies a second part of the drive-through route, including sections 306c and 306d, from the ordering booth to the pick-up window, by drawing this route on the map. The user identifies the location of the pick-up window 310 by marking it on the map. In some examples, the portal and/or application for adding a drive-through behavior zone includes an option specifically for identifying the pick-up window 310 location. The user can also draw the last part of the drive-through route on the map, from the pick-up window 310 to the exit (section 306e).

According to various implementations, the behavior zone portal links to a pre-defined autonomous vehicle behavior for an ordering booth, including stopping the vehicle at the ordering booth 308 to allow a passenger to place an order. Similarly, the behavior zone portal links to a pre-defined autonomous vehicle behavior for a pick-up window, including stopping the vehicle at the pick-up window 310 to allow a passenger to pick up an order.

According to some implementations, the user can also identify the location of the door 314 into the property 320. The user can define a drop-off (and/or curbside pick-up) location option as the location of the main door 314. Additionally, the user can identify the non-drive-through route from the entry 304 to the exit 312 (section 316).

In some examples, a user can add speed limits to various sections of the property 302. For example, a user can add a speed limit to any of the sections 306a-306e and the section 316. In some examples, only a property owner or representative can add unposted speed limits.

In various implementations, the map 300 is displayed through the portal and/or application on a touchscreen, and the user can draw on the map using a finger or stylus. In some examples, the map 300 is displayed through a non-touchscreen interface, and the user uses a curser, pointer, or other indicator controlled by a mouse or other tool to draw on the map 302.

In some implementations, the user is given the option to upload one or more photos or videos of the location. The user can also choose to identify what the photo is of and where it was taken from.

Example Behavior Zone for Alternative Pick-Up/Drop-Off Zones

Figure 4:
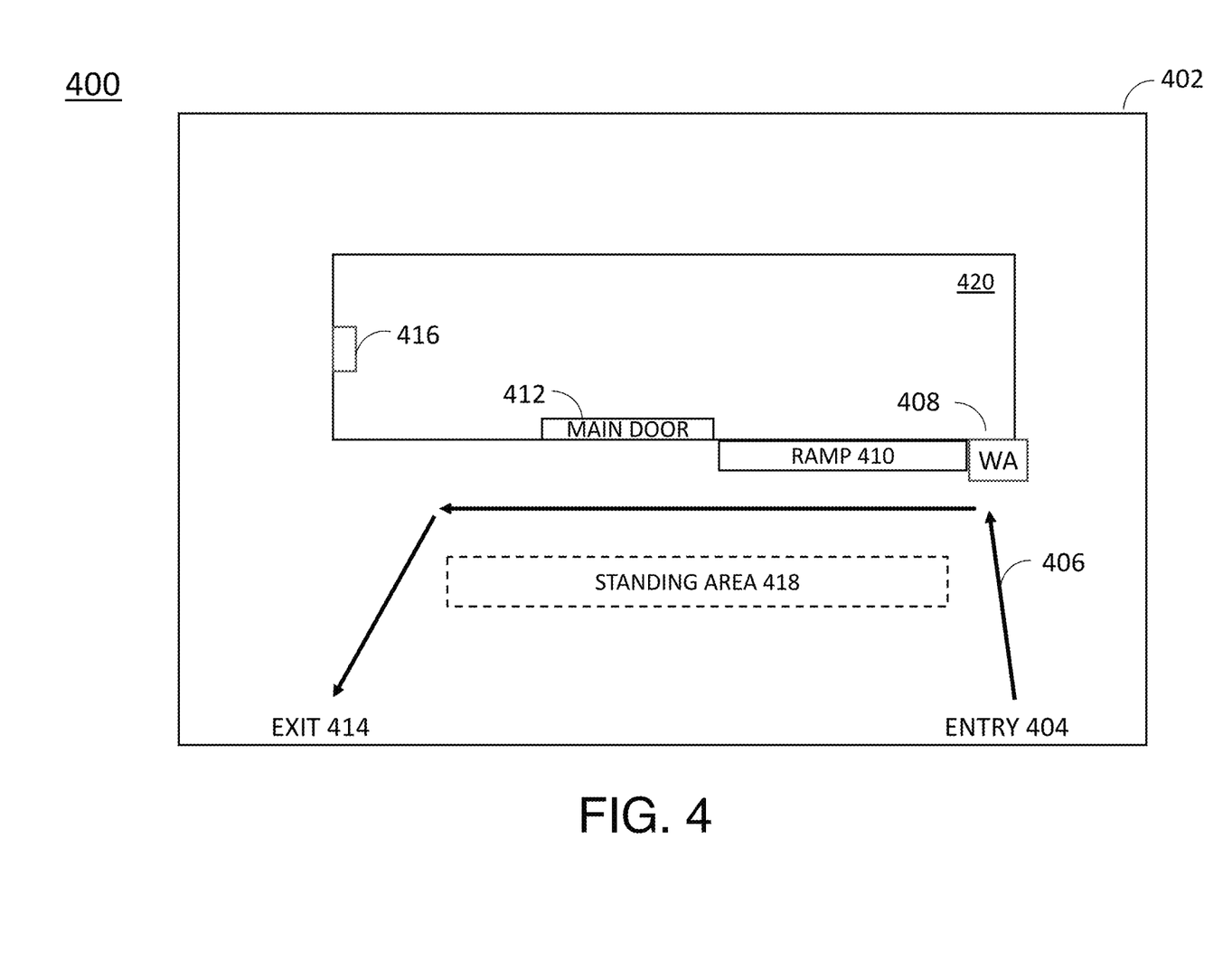
FIG. 4 is a diagram illustrating another map of a property for defining a behavior zone, according to some embodiments of the disclosure.

FIG. 4 shows a map 400 of a property 402 for defining a behavior zone, according to some embodiments of the disclosure. In particular, the map 400 shows a property 402 including a building 420 that has a main doorway 412 and a service doorway 416. Additionally, the map 400 shows a ramp 410 to the main door 412, with the bottom of the ramp marked as a wheelchair-accessible drop off location 408.

According to some implementations, when a user accesses the map 400 through a portal and/or application, the user selects what type of behavior zone the user would like to add. In the map 400, the user may request to add alternative pick-up/drop-off locations and a wheelchair-accessible pick-up/drop-off location. If the main door entrance is a loading zone (no parking allowed), the user may request to add a loading zone identification. After identifying the type of behavior zone to be added, the user is asked to identify selected locations and to mark certain routes on the map 400.

In particular, to add the wheelchair-accessible pick-up/drop-off location 408, the user selects the corresponding behavior zone type, and then identifies the location 408 on the map 400. Additionally, if the mapping system for the behavior zones does not yet have the entry 404, the driveway 406, and/or the exit 414 mapped, the user will be prompted to identify these locations. After identifying the locations of the entry 404 and the exit 414, the user may be prompted to draw on the map 400 the route 406 from the entry 404 to the exit 414.

Other pick-up/drop-off locations may also be added to the map 400. To add other pick-up/drop-off locations, the user selects the corresponding behavior zone type (e.g., "alternative pick-up/drop-off location"), and then identifies the main door location 412 on the map 400. The user may also choose to identify the service entrance 416.

In some examples, the user can specify where vehicles should wait to pick-up a passenger. In particular, on the map 400, the standing area 418 is a space for vehicles to stand while awaiting passengers. The user can identify the standing area 418 on the map 400 by drawing an outline or circle around the area 418.

Example of Autonomous Vehicle Fleet for Driving in Behavior Zones

Figure 5:
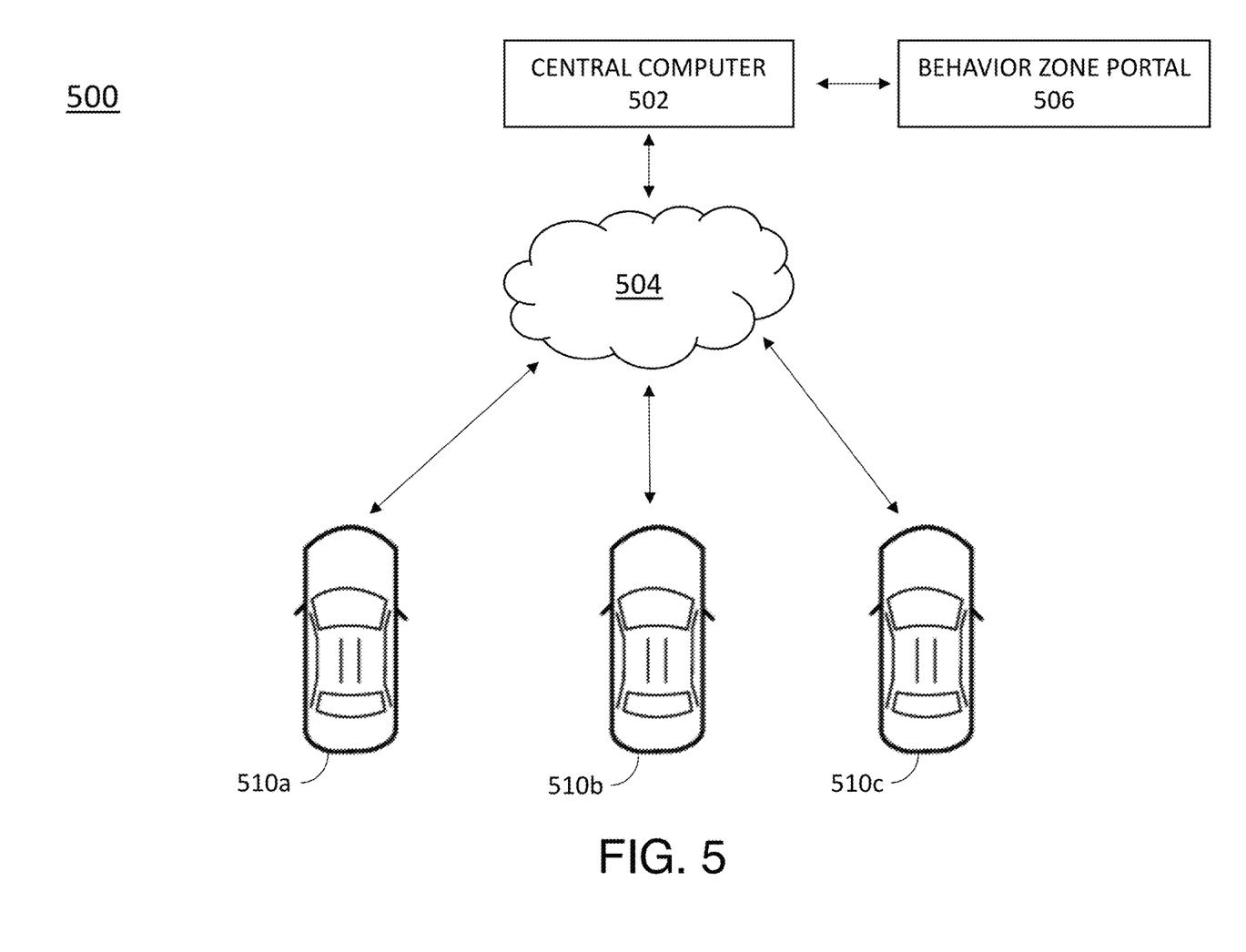
FIG. 5 is a diagram illustrating a fleet of autonomous vehicles in communication with a central computer, according to some embodiments of the disclosure.

FIG. 5 is a diagram 500 illustrating a fleet of autonomous vehicles 510a, 510b, 510c in communication with a central computer 502, according to some embodiments of the disclosure. As shown in FIG. 5, the vehicles 510a-510c communicate wirelessly with a cloud 504 and a central computer 502. The central computer 502 includes a routing coordinator and a database of information from the vehicles 510a-510c in the fleet. The central computer 502 receives behavior zone input from the behavior zone portal 506. Autonomous vehicle fleet routing refers to the routing of multiple vehicles in a fleet. In some implementations, autonomous vehicles 510a-510c communicate directly with each other.

When a ride request is received from a passenger, the routing coordinator selects an autonomous vehicle 510a-510c to fulfill the ride request, and generates a route for the autonomous vehicle 510a-510c. The generated route includes a route from the autonomous vehicle's present location to the pick-up location, and a route from the pick-up location to the final destination. Each of the autonomous vehicles 510a, 510b, 510c in the fleet are equipped to drive into behavior zones, such as zones on private property, as described above with respect to FIGS. 2, 3, 4, and 6. The vehicles 510a, 510b, 510c communicate with a central computer 502 via a cloud 504.

Each vehicle 510a-510c in the fleet of vehicles communicates with a routing coordinator. Information gathered by various autonomous vehicles 510a-510c in the fleet can be saved and used to generate information for future routing determinations, including updating behavior zone routing by more specifically identifying various parameters. For example, sensor data can be used to generate route determination parameters, including routes within a behavior zone. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals.

According to various implementations, a set of parameters can be established that determine which metrics are considered (and to what extent) in determining routes or route modifications. In some examples, the route within a behavior zone includes a drive-through. Specific drive-through behavior can be updated based on vehicle sensor data from proceeding through the drive-through. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location and any behavior zone location information, and an onboard computer on the selected autonomous vehicle generates a route and navigates to the destination. In some implementations, the routing coordinator in the central computing system 502 generates a route for each selected autonomous vehicle 510*a*-510*c*, and the routing coordinator determines a route for the autonomous vehicle 510*a*-510*c* to travel from the autonomous vehicle's current location to a first intermediate stop.

Example Method for Driving to a Behavior Zone

Figure 6:
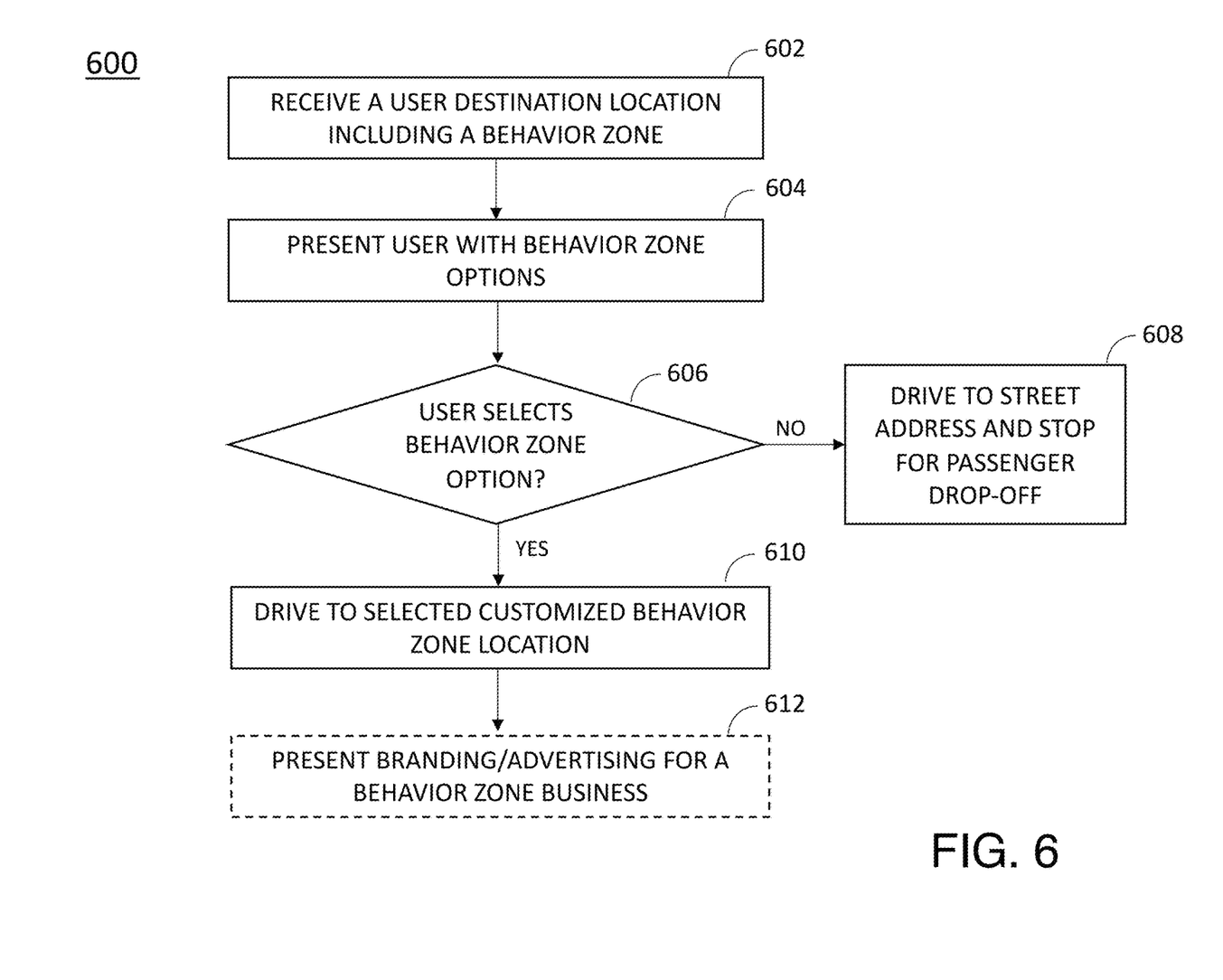
FIG. 6 is a diagram illustrating a method for providing autonomous vehicle rides to private property including behavior zones, according to some embodiments of the disclosure.

FIG. 6 shows a method 600 for providing autonomous vehicle rides to private property including behavior zones, according to some embodiments of the disclosure. At step 602, a requested destination location is received from a passenger, and the destination location includes a behavior zone. In particular, the destination location is an address, and there is a behavior zone at that address that presents the option of the autonomous vehicle driving onto the property (e.g., into a driveway or entryway) at the destination location. In some examples, a requested destination includes a business name, and the passenger selects the location from a list (or map) of various addresses for that business.

At step 604, one or more behavior zone options are presented to the passenger. In some examples, the passenger is presented with two or more specific drop-off locations at the requested destination. In some examples, the passenger is presented with an option of driving onto the property to a specific location (e.g., "main entrance") or being dropped off on the street. In some examples, the requested destination location is a service provider that includes a drive-through option, and the passenger is presented with the option to proceed through the drive-through. In another example, a passenger is presented with three options: being dropped off on the street, a first behavior zone drop-off near a wheelchair ramp by the front door, and a second behavior zone curbside pick-up location.

At step 606, it is determined whether the passenger selects the option to enter the behavior zone. If the passenger chooses not to enter the behavior zone, at step 608, the autonomous vehicle proceeds to drive to the street address for the requested destination location for passenger drop-off. If the passenger selects the option to enter the behavior zone, at step 610, the autonomous vehicle drives to the customized location within the behavior zone.

In some examples, at step 606, the passenger selects the behavior zone option, and the behavior zone is a drive-through for a service provider, or a curbside pickup location. In various examples, if the passenger selects a drive-through option or a curbside-pickup option, the passenger is prompted to add a further destination for passenger drop-off. In some examples, for curbside-pickup, the autonomous vehicle waits for the passenger in a vehicle waiting zone. In another example, the behavior zone is a hotel's check-in loading zone near the front desk, selecting this option allows the passenger to be taken directly to the front door of the hotel.

In another example, the behavior zone is a private residence, and the passenger is presented with the option of being dropped off on the street at the public address, or at the front door of the house down a long driveway. By selecting the front door location, the passenger can avoid a long walk down the driveway to the front door.

After step 610, when an autonomous vehicle is directed to drive into a behavior zone, the passenger may be prompted to provide feedback on autonomous vehicle driving behavior in the behavior zone. For example, the passenger may be prompted regarding passenger satisfaction with the drop-off location, passenger satisfaction with stops for a drive-through, and/or passenger satisfaction with vehicle driving behavior on the driveways or private roads within the behavior zone.

In some examples, when a passenger selects a behavior zone, at step 612, branding and or advertising associated with a business at the behavior zone is presented to the passenger. For example, if the behavior zone is a food service provider, the autonomous vehicle displays may display advertising for the food service provider. Similarly, if the behavior zone is a hotel, the autonomous vehicle displays may display advertising for the hotel. In some examples, an audio message is played, such as "Welcome to [business X]". In some examples, the branding/advertising appears when the vehicle enters the private property including the behavior zone. In some examples, the branding/advertising is provided as an additional incentive for businesses to add behavior zones for their locations to the vehicle mapping system.

In some implementations, deeper customization options are embedded in a ride request application, and the destination is linked to other passenger data. In one example, when a passenger approaches the airport, a message is displayed including the terminal, airline, flight number, flight status, and check-in counter. In some examples, this information is taken from the passenger's email and/or calendar. In another example, as a passenger approaches a hotel, a QR code is displayed for an expedited check-in with the passenger's app so that the passenger can go straight to their room instead of checking in at the lobby. In a further example, as a passenger approaches a drive-through, the restaurant's menu can be accessed directly from an in-vehicle tablet. This can help avoid slow interactions that cause bottlenecks and/or rushed decisions. In another example, a vehicle is requested by a company to pick up an interviewee, and a personalized welcome message is displayed on the in-vehicle tablet and automatically routes the interviewee to their next destination.

Example Interface for Providing a Behavior Zone Option to a User

Figure 7:
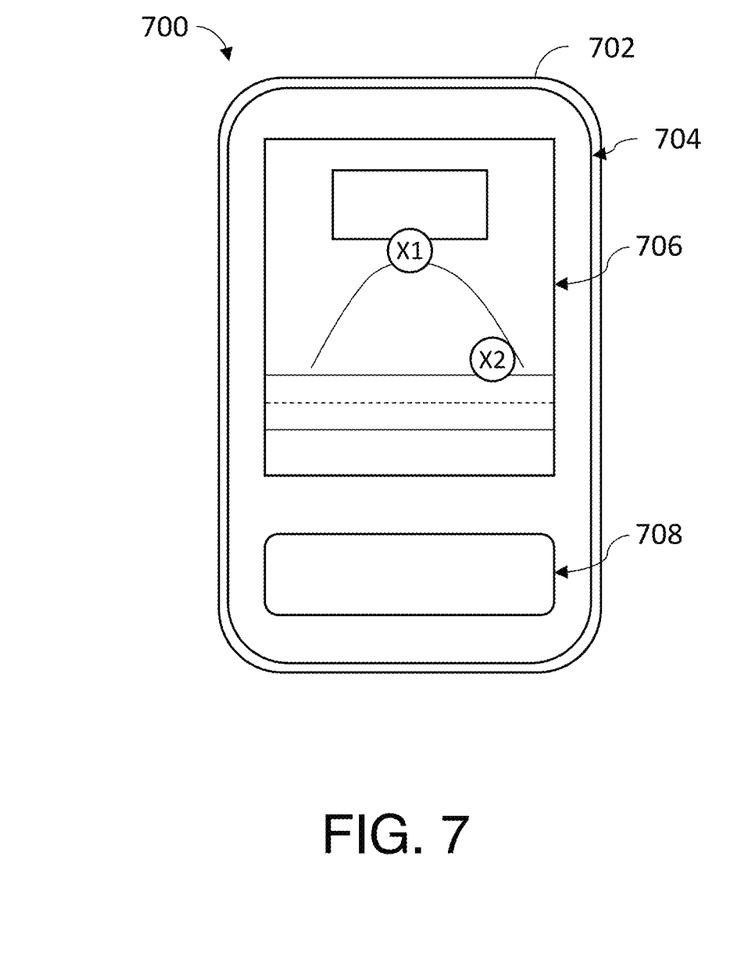
FIG. 7 shows an example of an interface for providing a behavior zone option to a user, according to some embodiments of the disclosure.

FIG. 7 shows an example 700 of an interface for providing a behavior zone option to a user, according to some embodiments of the disclosure. In particular, a device 702 shows a behavior zone selection interface 704 showing a map 706. According to various examples, the map 706 is displayed to a user after a ride request application receives a request with a pick-up address or destination address that includes a behavior zone. On the map 706, the location marked X2 is the default pick-up/drop-off location corresponding to the address of the request. However, the user is presented with the map 706 and asked to choose between the default address location X2 and a main entrance location X1. Once the user selects one of the options X1 and X2, the ride request is finalized. In some examples, the user can also select the button 708 to amend and/or cancel the request.

Example of a Computing System for Ride Requests

Figure 8:
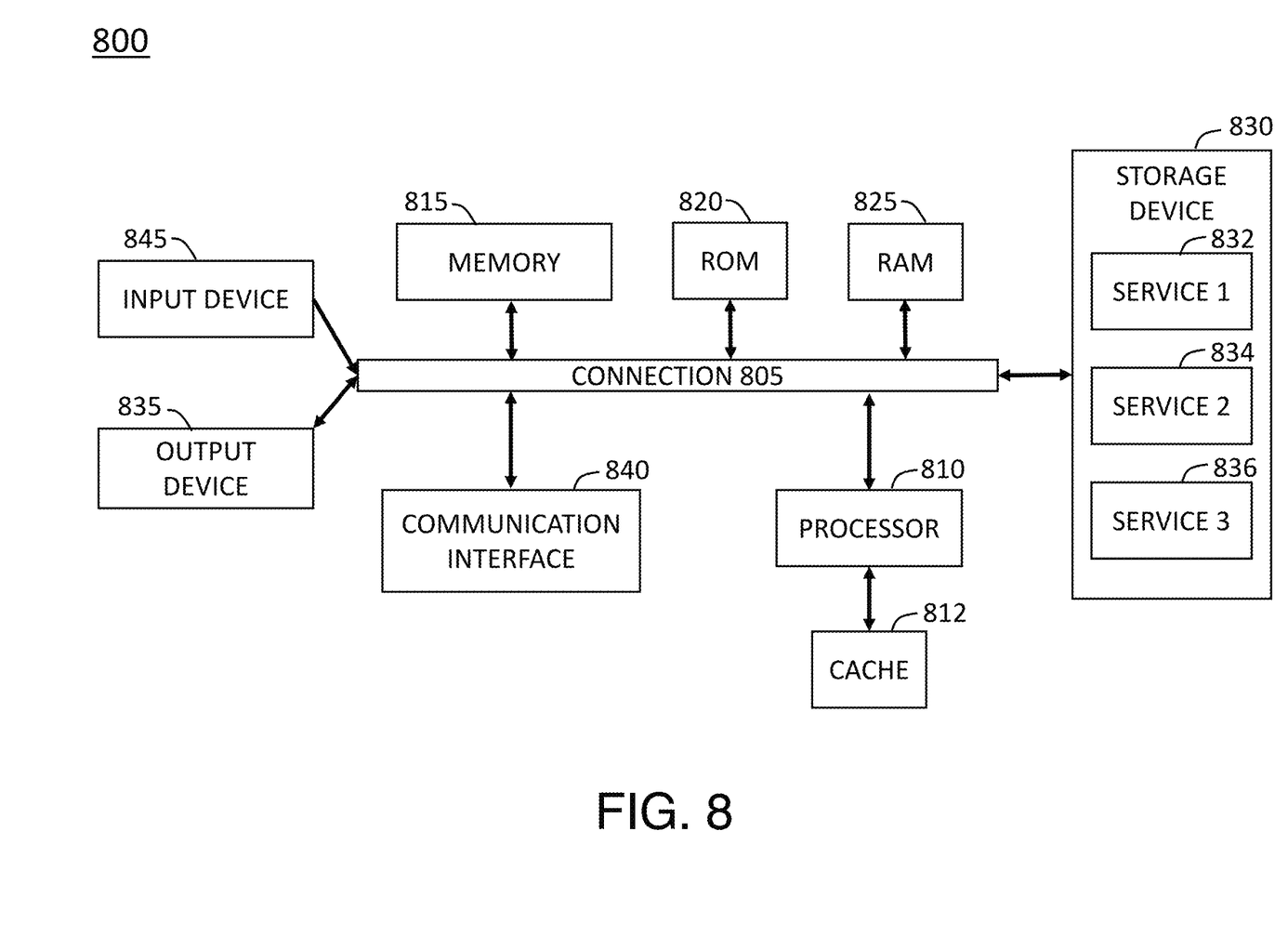
FIG. 8 shows an example embodiment of a system for implementing certain aspects of the present technology.

FIG. 8 shows an example embodiment of a computing system 800 for implementing certain aspects of the present technology. In various examples, the computing system 800 can be any computing device making up the onboard computer 104, the central computing system 502, or any other computing system described herein. The computing system 800 can include any component of a computing system described herein which the components of the system are in communication with each other using connection 805. The connection 805 can be a physical connection via a bus, or a direct connection into processor 810, such as in a chipset architecture. The connection 805 can also be a virtual connection, networked connection, or logical connection.

In some implementations, the computing system 800 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 800 includes at least one processing unit (CPU or processor) 810 and a connection 805 that couples various system components including system memory 815, such as read-only memory (ROM) 820 and random access memory (RAM) 825 to processor 810. The computing system 800 can include a cache of high-speed memory 812 connected directly with, in close proximity to, or integrated as part of the processor 810.

The processor 810 can include any general-purpose processor and a hardware service or software service, such as services 832, 834, and 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction, the computing system 800 includes an input device 845, which can represent any number of input mechanisms, such as a microphone for speech, a touch-sensitive screen for gesture or graphical input, keyboard, mouse, motion input, speech, etc. The computing system 800 can also include an output device 835, which can be one or more of a number of output mechanisms known to those of skill in the art. In some instances, multimodal systems can enable a user to provide multiple types of input/output to communicate with the computing system 800. The computing system 800 can include a communications interface 840, which can generally govern and manage the user input and system output. There is no restriction on operating on any particular hardware arrangement, and therefore the basic features here may easily be substituted for improved hardware or firmware arrangements as they are developed.

A storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as a processor 810, a connection 805, an output device 835, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for defining a behavior zone for an autonomous vehicle fleet, comprising receiving a behavior zone request for a selected location, identifying a behavior type to customize, determining specific vehicle behaviors associated with the behavior zone request, reviewing the behavior zone request.

Example 2 provides a method according to one or more of the preceding and/or following examples, including verifying a user relationship with the selected location.

Example 3 provides a method according to one or more of the preceding and/or following examples, including receiving at least one of an address and a business name associated with the selected location.

Example 4 provides a method according to one or more of the preceding and/or following examples, wherein the behavior type includes at least one of a drive through behavior, a drop-off location, a pick-up location, a loading zone location, a speed limit, a wheelchair-accessible drop-off location, and a wheelchair-accessible pick-up location.

Example 5 provides a method according to one or more of the preceding and/or following examples, including receiving an image of the selected location.

Example 6 provides a method according to one or more of the preceding and/or following examples, wherein determining specific vehicle behaviors includes identifying a route within the behavior zone.

Example 7 provides a method according to one or more of the preceding and/or following examples, wherein the behavior type is a drive-through behavior, and wherein determining specific vehicle behaviors further includes determining at least one stopping location.

Example 8 provides a method according to one or more of the preceding and/or following examples, including receiving vehicle customization requests corresponding to the behavior zone.

Example 9 provides a system for defining a behavior zone for an autonomous vehicle fleet, comprising an online portal configured to receive a behavior zone request including a behavior zone location and a behavior type; and a central computing system configured to receive the behavior zone request, review the behavior zone request, and determine specific vehicle behaviors associated with the behavior zone request.

Example 10 provides a system according to one or more of the preceding and/or following examples, wherein the behavior zone request is received from a user, and wherein the central computing system is further configured to verify a user relationship with the behavior zone location.

Example 11 provides a system according to one or more of the preceding and/or following examples, wherein the online portal is further configured to receive at least one of an address and a business name associated with the behavior zone location.

Example 12 provides a system according to one or more of the preceding and/or following examples, further including a passenger interface configured to display the behavior zone associated with a selected location.

Example 13 provides a system according to one or more of the preceding and/or following examples, wherein the online portal is further configured to receive vehicle customization requests corresponding to the behavior zone.

Example 14 provides a method for providing autonomous vehicle rides to private property, comprising receiving a passenger destination location including a behavior zone, presenting passenger behavior zone options, receiving a passenger selection within the behavior zone, driving into the behavior zone, and following behavior zone directions corresponding to the passenger selection.

Example 15 provides a method according to one or more of the preceding and/or following examples, wherein behavior zone options include at least one of a pick-up location, a drop-off location, wheelchair accessible pick-up location, a wheelchair-accessible drop-off location, a drive-through, a stopping zone, and a loading zone.

Example 16 provides a method according to one or more of the preceding and/or following examples, further comprising providing business-related in-vehicle customization features corresponding to the private property.

Example 17 provides a method according to one or more of the preceding and/or following examples, wherein the business-related features include at least one of an audio message, a video message, and a customized on-screen display.

Example 18 provides a method according to one or more of the preceding and/or following examples, further comprising presenting personalized information to a passenger based on the behavior zone, wherein the personalized information includes details regarding a passenger reservation at a behavior zone business.

Example 19 provides a method according to one or more of the preceding and/or following examples, wherein the behavior zone is a drive-through, and further comprising requesting a drop-off destination location.

Example 20 provides a method according to one or more of the preceding and/or following examples, further comprising requesting passenger review of vehicle behavior in the behavior zone.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for defining a behavior zone for an autonomous vehicle fleet, comprising:
  receiving a behavior zone request for a selected location, wherein the selected location is a private property, and wherein the behavior zone request applies to vehicles in the autonomous vehicle fleet;
  identifying a behavior type to customize, wherein the behavior type includes at least one of a drive through behavior, a drop-off location, a pick-up location, a loading zone location, a wheelchair-accessible drop-off location, and a wheelchair-accessible pick-up location;
  presenting a map of the behavior zone;
  determining specific vehicle behaviors associated with the behavior zone request, wherein determining specific vehicle behaviors includes identifying a route within the behavior zone, and wherein identifying the route includes receiving a depiction on the map indicating the route;
  verifying a user relationship with the selected location;
  reviewing the behavior zone request;
  adding the specific vehicle behaviors associated with the behavior zone to a mapping system for the autonomous vehicle fleet, wherein the specific vehicle behaviors associated with the behavior zone apply to autonomous vehicles in the autonomous vehicle fleet,
  receiving a ride request from a ridehail application including a destination, wherein the destination includes the behavior zone;
  assigning a first autonomous vehicle to fulfill the ride request, wherein the first autonomous vehicle includes an onboard computer;
  transmitting a behavior zone option to the ridehail application, wherein the behavior zone option includes the specific vehicle behaviors;
  receiving a selection from the ridehail application for the behavior zone option; and controlling the first autonomous vehicle, via the onboard computer, to apply the specific vehicle behaviors in the behavior zone, including following the route in the behavior zone.

2. The method of claim 1, further comprising receiving at least one of an address and a business name associated with the selected location.

3. The method of claim 1, further comprising:
receiving an image of the selected locationi
receiving an image location and an image description corresponding to the image;
receiving an identification of a specific location on the map of the behavior zone of the image; and
adding the selected image and at a corresponding specific location in the mapping system for the autonomous vehicle fleet.

4. The method of claim 1, wherein the behavior type is a drive-through behavior, and wherein determining specific vehicle behaviors further includes determining at least one stopping location.

5. The method of claim 1, further comprising receiving vehicle customization requests corresponding to the behavior zone.

6. A system for defining a behavior zone for an autonomous vehicle fleet, comprising:
an online portal including a user interface configured to:
display a behavior zone associated with a selected location, wherein the selected location is a private property,
present a map of the behavior zone,
receive a depiction on the map indicating a route within the behavior zone, and
generate a behavior zone request based on the map and the depiction, wherein the behavior zone request includes the selected location, the route, and a behavior type; and
a central computing system configured to:
receive the behavior zone request,
review the behavior zone request,
determine specific vehicle behaviors associated with the behavior zone request, wherein determining specific vehicle behaviors includes identifying the route within the behavior zone,
verify a user relationship with the selected location,
add the specific vehicle behaviors associated with the behavior zone to a mapping system for the autonomous vehicle fleet, wherein the specific vehicle behaviors associated with the behavior zone apply to autonomous vehicles in the autonomous vehicle fleet,
receive a ride request from a ridehail application including a destination, wherein the destination includes the behavior zone;
assign a first autonomous vehicle to fulfill the ride request, wherein the first autonomous vehicle includes an onboard computer;
transmit a behavior zone option to the ridehail application, wherein the behavior zone option includes the specific vehicle behaviors;
receive a selection from the ridehail application for the behavior zone option;
the first autonomous vehicle of the autonomous vehicle fleet, including an onboard computer to control the first autonomous vehicle to apply the specific vehicle behaviors and to follow the route in the behavior zone.

7. The system of claim 6, wherein the behavior zone request is received from the user via the user interface.

8. The system of claim 6, wherein the online portal is further configured to receive at least one of an address and a business name associated with the behavior zone location.

9. The system of claim 6, wherein the online portal is further configured to receive vehicle customization requests corresponding to the behavior zone.

10. A method for providing autonomous vehicle rides to private property, comprising:
receiving a passenger destination location including a behavior zone, wherein the passenger destination location is located on private property;
presenting a map including the passenger destination location;
presenting passenger behavior zone options on the map, wherein behavior zone options include at least one of a pick-up location, a drop-off location, wheelchair accessible pick-up location, a wheelchair-accessible drop-off location, a drive-through, a stopping zone, and a loading zone;
receiving a passenger selection within the behavior zone, wherein the passenger selection includes a manually-entered depiction on the map indicating a route within the behavior zone;
autonomously controlling a first autonomous vehicle to drive into the behavior zone and follow the route within the behavior zone;
autonomously controlling the first autonomous vehicle to follow behavior zone directions corresponding to the passenger selection;
transmitting a request for passenger feedback on autonomous vehicle driving behavior in the behavior zone;
receiving passenger feedback on autonomous vehicle driving behavior in the behavior zone; and
adjusting specific vehicle behaviors corresponding to the behavior zone based on the passenger feedback.

11. The method of claim 10, further comprising providing business-related in-vehicle customization features corresponding to the private property.

12. The method of claim 11, wherein the business-related features include at least one of an audio message, a video message, and a customized on-screen display.

13. The method of claim 10, further comprising presenting personalized information to a passenger based on the behavior zone, wherein the personalized information includes details regarding a passenger reservation at a behavior zone business.

14. The method of claim 10, wherein the behavior zone is a drive-through, and further comprising requesting a drop-off destination location.

15. The method of claim 10, further comprising requesting passenger review of vehicle behavior in the behavior zone.

16. The method of claim 1, wherein receiving the depiction on the map indicating the route includes receiving a manually-entered depiction via a user interface.

17. The method of claim 3, wherein the image includes a video of the selected location.

18. The system of claim 6, wherein the depiction received at the user interface is a manually entered depiction.

19. The system of claim 6, wherein the user interface is further configured to:
receive an image of the selected location,
receive an input with the image identifying the image, and
receive an identification of a specific location on the map of the behavior zone of the image.

20. The method of claim 1, wherein the specific vehicle behaviors associated with the behavior zone include presenting, via the ridehail application, other passenger information for the destination, wherein the other passenger information includes one or more of passenger flight information, hotel check-in information, and restaurant menu information.

* * * * *